United States Patent [19]

Waggener

[11] 4,320,345
[45] Mar. 16, 1982

[54] ADAPTIVE DIFFERENTIAL PSK DEMODULATOR

[75] Inventor: William N. Waggener, Sarasota, Fla.

[73] Assignee: Sangamo Weston, Inc., Norcross, Ga.

[21] Appl. No.: 144,752

[22] Filed: Apr. 28, 1980

[51] Int. Cl.³ .............................................. H03D 3/18
[52] U.S. Cl. ..................................... 329/50; 329/122; 375/81; 375/83
[58] Field of Search ................. 329/50, 104, 122, 123, 329/136, 137; 375/81, 83–87, 94, 96

[56] References Cited

U.S. PATENT DOCUMENTS

| | | | |
|---|---|---|---|
| 3,906,376 | 9/1975 | Bass | 329/122 X |
| 3,908,115 | 9/1975 | Waggener | 375/81 X |
| 4,093,824 | 6/1978 | Grosjean | 329/122 X |
| 4,095,187 | 6/1978 | Yoshida | 329/50 |
| 4,099,130 | 7/1978 | Yoshida | 329/104 |
| 4,100,495 | 7/1978 | Luvison et al. | 329/104 X |
| 4,100,499 | 7/1978 | Monrolin | 329/50 |
| 4,107,624 | 8/1978 | Turner | 329/50 X |
| 4,110,693 | 8/1978 | Evans . | |
| 4,110,706 | 8/1978 | Matsumoto et al. | 329/104 |
| 4,110,725 | 8/1978 | Petrosky . | |
| 4,117,405 | 9/1978 | Martinez . | |
| 4,117,410 | 9/1978 | Bender | 329/50 |
| 4,119,912 | 10/1978 | Turi Nagy et al. . | |
| 4,121,165 | 10/1978 | Dogliotti et al. | 329/50 |
| 4,123,719 | 10/1978 | Hopwood et al. | 329/104 X |
| 4,135,164 | 1/1979 | Kurata | 329/122 X |
| 4,224,575 | 9/1980 | Mosley et al. | 329/122 X |

FOREIGN PATENT DOCUMENTS 2001218 1/1979 United Kingdom ................. 375/86

OTHER PUBLICATIONS

Bennett et al., Data Transmission, McGraw-Hill, 1965, p. 208.
Lucky et al., Principles of Data Communication, McGraw-Hill, 1968, pp. 246-263.

Primary Examiner—Siegfried H. Grimm
Assistant Examiner—Edward P. Westin
Attorney, Agent, or Firm—Dale V. Gaudier; Mikio Ishimaru

[57] ABSTRACT

An adaptive differential phase shift keyed (PSK) signal demodulator which optimally tracks changes in the symbol rate of the signal. An input signal is delayed by one symbol period by passing the signal through a charge coupled device (CCD) clocked by pulses phase locked to the symbol rate ($F_{br}$) by a phase locked loop, the phase locked loop also outputting clock pulses at the symbol rate to strobe a symbol decision circuit. The CCD has L stages and is clocked at a rate $L \cdot F_{br}$. As the phase locked loop tracks changes in the symbol rate, the clock pulses are varied in rate so that the CCD delay is adaptively optimized for a given symbol rate. Digital tuning is provided by an adjustable divider circuit coupling the voltage controlled oscillator of the phase locked loop to the CCD, so that by digitally selecting the division ratio the demodulator is tuned to a different symbol rate.

36 Claims, 11 Drawing Figures

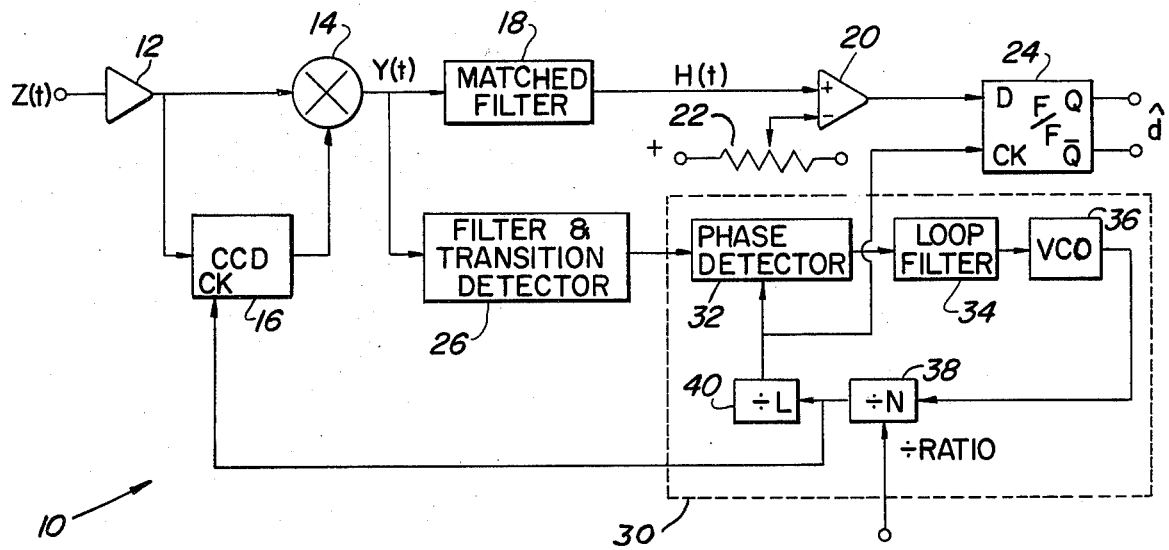
FIG. 1
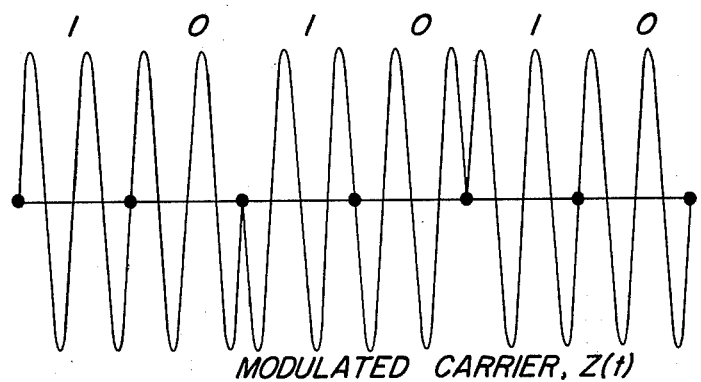
FIG. 2a  MODULATED CARRIER, Z(t)
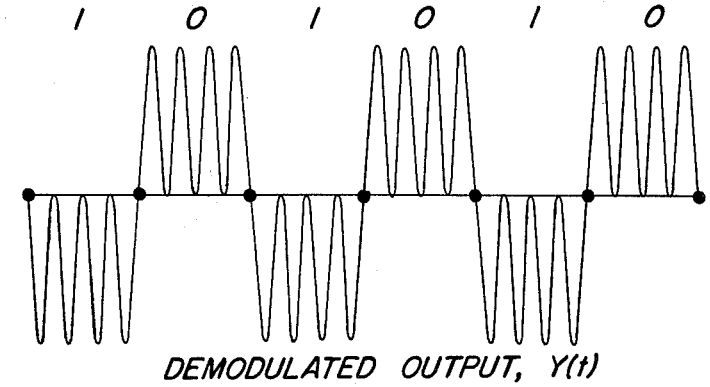
FIG. 2b  DEMODULATED OUTPUT, Y(t)
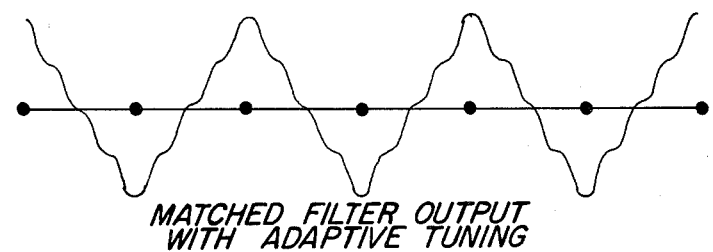
FIG. 2c  MATCHED FILTER OUTPUT WITH ADAPTIVE TUNING

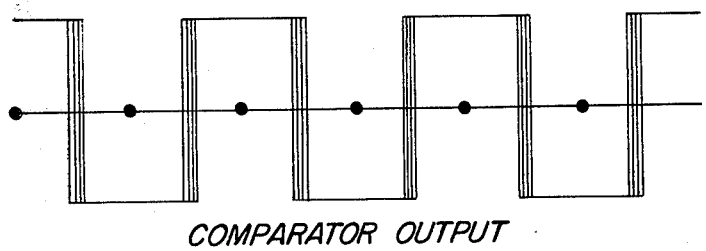
FIG. 2d COMPARATOR OUTPUT
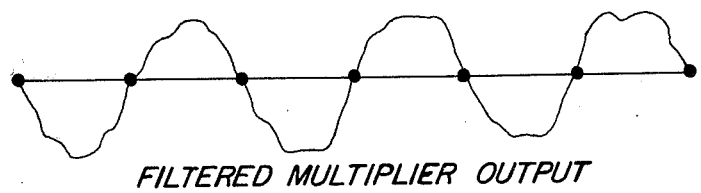
FIG. 2e FILTERED MULTIPLIER OUTPUT
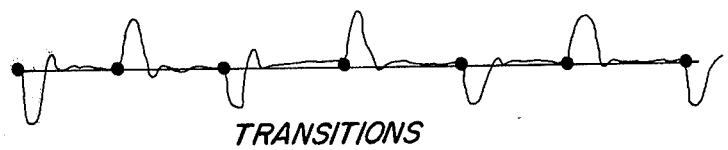
FIG. 2f TRANSITIONS
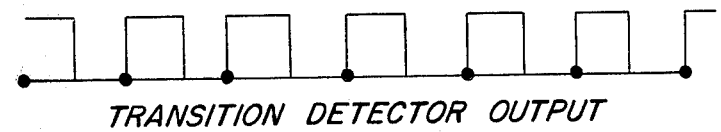
FIG. 2g TRANSITION DETECTOR OUTPUT
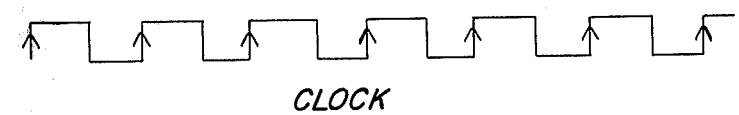
FIG. 2h CLOCK
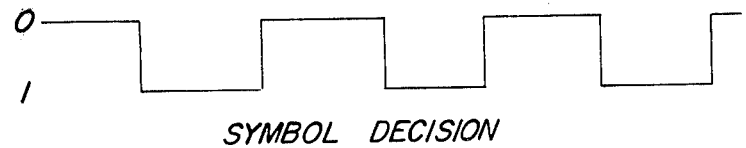
FIG. 2j SYMBOL DECISION

ADAPTIVE DIFFERENTIAL PSK DEMODULATOR

BACKGROUND OF THE INVENTION

The present invention relates to data communications, and more particularly to differential demodulators, especially for phase shift keyed (PSK) signals.

Phase shift keying or digital phase modulation as it is frequently called is widely used by the data communications industry. In PSK data communication systems digital information is conveyed in the form of phase differences between successive symbol periods of a carrier wave. The receiver derives the digital information by detecting the changes of phase of the incoming signal. For example, a detectable change in phase can be arbitrarily assigned a digital value of "1", whereas no detectable change in phase can be assigned a digital value of "0". More detailed descriptions of PSK communication techniques are found in Lucky, Salz, and Weldon, *Principles of Data Communication*, Chapters 3 and 9 (McGraw Hill 1968) and in R. W. Bennett and J. R. Davey, *Data Transmission*, Chapter 10, (McGraw Hill 1965).

Two general methods of digital phase detection (PSK demodulation) are coherent detection and differential detection. Coherent detection employs a phase reference and a carrier tracking loop at the receiver. This method, theoretically, is the optimum for detection of PSK signals. However, performance of such a demodulation scheme is severely degraded when the signals are subject to secondary phase-shifting and noise due to less than optimum propagation conditions.

Differential detection (also known as differentially coherent detection) utilizes a phase reference derived from past signaling intervals to demodulate a PSK signal. In this technique an incoming symbol (a binary digit or bit) is delayed by a time delay network for one symbol period ($T_b$) to act as a phase reference for the next succeeding symbol. Differential detection is an attractive technique because no carrier tracking loop or internal phase reference is required. However, one problem is that, as noted by Bennett and Davey at page 208, "The delay network type of reference has the disadvantage of being somewhat more difficult to adapt to different symbol rates than other methods."

A second problem of differential detection is that at every symbol rate, the symbol delay must be very accurate to avoid significant performance degradation. Such a problem becomes serious, for example, when a received modulated signal is recorded on tape and later demodulated. Such problems as recorder jitter (i.e. variation in tape speed) introduce variations in the recording or playback speed, and corresponding variations in the symbol rate, which cause degradation in performance of the differential demodulator.

SUMMARY OF THE INVENTION

The present invention overcomes the problems of the prior art by providing an improved differential demodulator which optimally tracks changes in the symbol rate. The demodulator includes means for receiving modulated input signals and for applying the signals to a multiplier and to means which applies a delayed signal to the multiplier. Means are coupled to the multiplier output for generating signals related to the symbol rate of the signal to be demodulated, and symbol decision means is coupled to the multiplier output and the signal generating means, to provide a demodulated output signal. The delay means is responsively coupled to the signal generating means so that the interposed delay is related to a parameter (such as frequency) of the modulated signals. Illustratively, the delay device is an L-stage charge coupled device (CCD), and the signal generating means is a phase locked loop which provides two sets of clock pulses that are phase locked to the symbol (baud) rate, $F_{br}$. Pulses at the symbol rate trigger the symbol decision means, and pulses at the rate $L \cdot F_{br}$ clock the L stage CCD, thus causing the time delay to be equal to the symbol period. As the phase locked loop tracks changes in the symbol rate, the pulses at the rate $L \cdot F_{br}$ vary correspondingly, so that the time delay is adaptively changed to an optimum value for differential phase demodulation of a received signal. A divider circuit in the phase locked loop is adjustable so that the division ratio can be digitally selected, whereby the demodulator can be selectively tuned to different symbol rates.

BRIEF DESCRIPTION OF THE DRAWINGS

Further features and advantages of the present invention will be apparent from the following detailed description when taken in conjunction with the accompanying drawing Figures, wherein:

FIG. 1 is a block diagram of a first preferred embodiment of a demodulator according to the present invention for demodulating binary phase PSK signals;

FIG. 2A shows a modulated carrier signal as would be input into the device of FIG. 1;

FIG. 2B shows the output waveform of the multiplier shown in FIG. 1 when the signal of FIG. 2A is inputted and the delay is exactly equal to the symbol period;

FIG. 2C shows the output waveform of the matched filter shown in FIG. 1;

FIG. 2D shows the output waveform of the comparator shown in FIG. 1;

FIG. 2E shows the filtered output waveform of the multiplier shown in FIG. 1;

FIG. 2F shows pulses shown in FIG. 2E at detected data transitions;

FIG. 2G shows the output pulse train of the transition detector shown in FIG. 1;

FIG. 2H shows pulses outputted at the symbol rate by the phase locked loop shown in FIG. 1;

FIG. 2J shows the output of the demodulator of FIG. 1; and

DETAILED DESCRIPTION OF THE PREFERRED EMBODIMENTS

Figure 3:
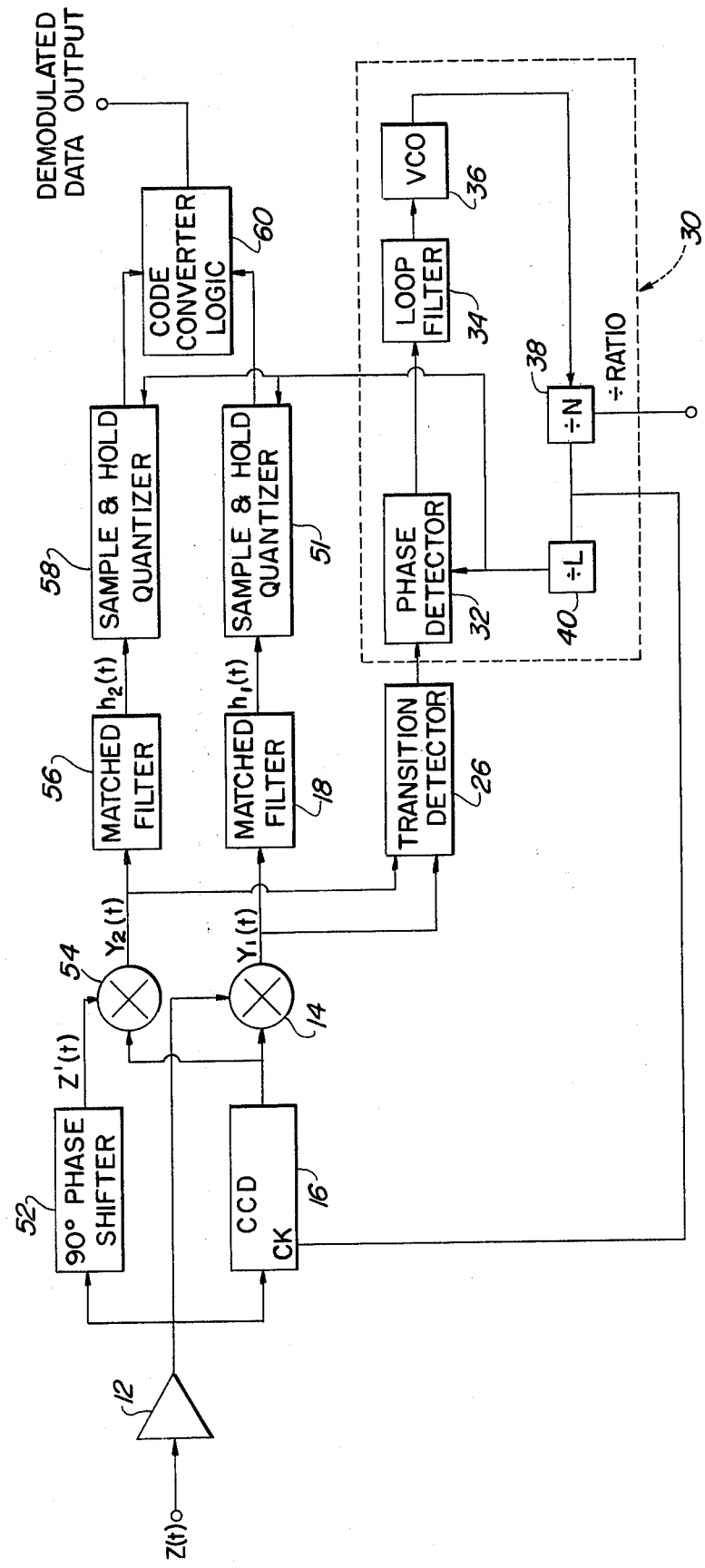
FIG. 3 is a block diagram of a second preferred embodiment of a demodulator according to the present invention for demodulating multiple phase PSK signals.

Referring to FIG. 1 there is shown a block diagram of a binary phase PSK demodulator 10. A modulated carrier signal Z(t) (FIG. 2A) is amplified by an input amplifier 12 and then applied to one input of a multiplier 14. Amplifier 12 also applies an amplified input signal to the input stage of a charge coupled device (CCD) 16. The input signal is clocked through CCD 16 to produce a time delay and the delayed signal is then applied to a second input of the multiplier 14. The multiplier output Y(t) (FIG. 2B) is inputted to a low pass type matched filter 18, whose output H(t) (FIG. 2C) is applied to a comparator 20 for comparison against a selectable threshold determined by an adjustable voltage source 22 applied to a second input of comparator 20. The output of comparator 20 (FIG. 2D) is applied to a symbol decision circuit 24 which illustratively is a "D-type" flip-flop. As shown in FIG. 1 the output of comparator 20 is applied to the D input of the flip-flop.

The multiplier output Y(t) is also applied to a filter and transition detector 26 which filters (FIG. 2E) and differentiates the signal to produce first pulses at data transitions (FIG. 2F). These first pulses are then rectified and used to trigger a monostable multivibrator or similar circuit (part of detector circuit 26) to produce second pulses at the symbol rate (FIG. 2G). These second pulses are applied to a phase locked loop (PLL) 30 which includes a phase detector 32, the output of which is coupled by a loop filter 34 to the input of a voltage controlled oscillator (VCO) 36. The output of VCO 36 is applied to a first divider circuit 38 whose output clocks CCD 16 with clock pulses phase locked to the symbol (baud) rate $F_{br}$. The output of divider circuit 38 is also applied to a second divider circuit 40, whose output clocks phase detector 32 and flip-flop 24 for symbol decision.

The circuit of FIG. 1 operates as follows. A modulated carrier Z(t), shown in FIG. 2A, can be expressed as $$Z(t) = \sqrt{2} A \cos[\omega_c t + \Psi(t)] + \eta(t) \qquad (1)$$

where A is the RMS carrier amplitude, $\omega_c$ is the carrier frequency in radians per second, $\Psi(t)$ is the phase modulation containing the desired information, and $\bar{\eta}(t)$ is noise and additive interference. Analog signal Z(t) is applied to CCD 16 which moves the analog charges from stage to stage in response to successive clock pulses applied to input CK of CCD 16 from PLL 30. The total delay $T_d$ interposed by CCD 16 is $$T_d = L/f_{clk} \qquad (2)$$

where L is the effective number of delay stages in CCD 16 and $f_{clk}$ is the CCD clock input frequency.

The output Y(t) of multiplier 14 is shown in FIG. 2B and can be expressed as $$Y(t) = Z(t) \cdot Z(t - T_d). \qquad (3)$$

When the modulation is binary, then for successive symbol periods where there is no phase change, $$\Psi(t - T_d) = \Psi(t) \qquad (4)$$

and $$\cos[\omega_c t + (t)] = \cos[\omega_c t + \Psi(t - T_d)]. \qquad (5)$$

When successive symbols do have phase changes, then $$\Psi(t - T_d) = \Psi(t) + 180° \qquad (6)$$

and $$\cos[\omega_c t + (t)] = -\cos[\omega_c t + \Psi(t - T_d)]. \qquad (7)$$

Substituting, it can be seen that $$Y(t) = A^2 \hat{a}(t) \cos(\omega_c T_d) + \text{terms at } 2\omega_c \qquad (8)$$

where $\hat{a}(t) = \pm 1$ depending on the changes in carrier phase.

The output signal Y(t) of multiplier 14 is applied to matched filter 18 which attenuates the $2\omega_c$ terms and maximizes the signal-to-noise ratio. Such filters are well-known in the art and not explained at length herein. See, for example, M. Schwartz, *Information Transmission, Modulations and Noise*, (McGraw Hill). Briefly, if the noise is white (Gaussian), matched filter 18 has an impulse response which is a time reversed replica of the signal to be detected. For data symbols with a rectangular waveshape, the desired matched filter impulse response is a pulse of constant amplitude whose width equals one symbol period. Techniques for designing such filters are taught, for example, in Waggener, "Recent Advances in Symbol Synchronization," *ISA Transactions* (Volume 12, No. 1, 1973) and Turin, "An Introduction to Matched Filters," *IRE Transactions on Information Theory* (June 1960). To illustrate one design method, the transfer function H(s) approximation for a nonreturn-to-zero (NRZ) signal as described in Waggener is:

$$H(s) \simeq \frac{2T(T^2 S^2 + 4\pi^2)}{T^3 S^3 + 6T^2 S^2 + 4\pi^2 TS + 8\pi^2} \qquad (9)$$

where T is the symbol period.

To provide a numerical design example assume $T = 1$ second:

$$H(s) = \frac{2(S^2 + 4\pi^2)}{S^3 + 6S^2 + 4\pi^2 S + 8\pi^2} \qquad (10)$$

This transfer function may be factored into:

$$H(s) = \frac{(S^2 + 4\pi^2)}{(S^2 + 3.42465S + 30.6587)} \cdot \frac{2}{(S + 2.57534)} \qquad (11)$$

The first factor may be implemented by a variety of means such as the biquadratic active RC filter described in Tow, "Design Formulas for Active RC Filters Using Operational-Amplifier Biquad", *Electronics Letters*, Vol. 5, No. 15, pp. 339–341, (1969). The second factor may be realized using a simple RC network with an amplifier to provide the appropriate gain factor. FIG. 2C shows the output of one matched filter 18 for the illustrated example. The terms of Y(t) at twice the carrier frequency ($2\omega_c$) are attenuated by filter 18.

The output of matched filter 18, H(t), is proportional to the desired information and can be described as $$H(t) \simeq A^2 (\cos \omega_c T_d) \cdot \hat{a}(t). \qquad (12)$$

The output H(t) is applied to comparator 20, whose output waveform is shown in FIG. 2D. Comparator 20 determines the sign of H(t). The maximum signal is obtained when the carrier frequency is an integral multiple of the symbol period, i.e. $\omega_c T_d$ is an integer multiple of $\pi$ radians.

Demodulator 10 is adaptively tuned by clocking CCD 16 with clock pulses phase locked to the symbol rate. The multiplier output Y(t) is also applied to filter and transition detector 26. FIG. 2E shows the multiplier output after filtering by circuit 26. FIG. 2F shows the transitions of the waveform of FIG. 2E. These transitions cause a combined rectifier and multivibrator unit or similar signal transition detection means included as part of circuit 26 to trigger a sequence of square pulses as shown in FIG. 2G.

The transition detector output is applied to phase locked loop 30. Phase detector 32 and loop filter 34 cause VCO 36 to generate pulses at a frequency $F_{VCO}$ which is a multiple of the number of stages L in CCD 16 and the baud rate $F_{br}$:

$$F_{VCO} = L \cdot N \cdot F_{br} \qquad (13)$$

The VCO output is applied to a first divider circuit 38 which divides by N, where N is digitally selectable. The output of the first divider circuit 38 thus clocks CCD 16 at the rate $$F_{clk} = L \cdot F_{br} \qquad (14)$$

Accordingly, the delay time $T_d$ is equal to the inverse of the baud rate. As phase locked loop 30 tracks changes in the baud rate $F_{br}$, $F_{clk}$ and the corresponding time delay $T_d$ are adaptively changed to an optimum value so that $T_d$ is always very close to the symbol period. It will be appreciated that, if the baud rate is to be changed, first divider circuit 38 can be adjusted digitally to match the new baud rate.

The output of first divider circuit 38 is also applied to a second divider circuit 40 which divides by L, the number of stages in CCD 16, to output pulses at the baud rate $F_{br}$. The leading edges of these clock pulses coincide with data transitions, as shown in FIG. 2H. When such a clock pulse occurs, the complementary status of the D input of flip-flop 24 is transferred to the Q output. The flip-flop remains in this state even though the input may change, as it can change states only when a clock pulse occurs. Thus clocked flip-flop 24 performs a symbol decision function to output a signal representing either a "mark" (binary 1) or "space" (binary 0) as shown in FIG. 2J.

Referring now to FIG. 3, there is shown a block diagram of a PSK demodulator 50 for demodulating a multi-phase modulated carrier signal z(t). The binary and multiple phase PSK demodulators 10 and 50 are similar in construction and similar reference numerals are used for similar parts. PSK demodulator 50 includes an L-stage CCD 16 responsive to pulses provided by phase locked loop 30 for accurately delaying the received modulated signal by one symbol period despite variations in the baud rate. After passing through amplifier 12 the signal z(t) and a delayed signal $z(t-T_d)$ from CCD 16 are applied to multiplier 14. The product terms at $2\omega_c$ are attenuated by matched filter 18. The output of matched filter 18 is $h_1(t)$ and is applied to a sample and hold quantizing circuit 51 which periodically tests the value of $h_1(t)$.

In a quadrature path, the modulated signal z(t) is shifted by 90° by a conventional phase shifter 52, and its output $$Z'(t) = \sqrt{2}\, A \sin[\omega_c t + \Psi(t)] + \eta(t) \qquad (15)$$

is applied to a second multiplier 54, similar in function to multiplier 14, along with the delayed signal $$z(t-T_d) = \cos[\omega_c(t-T_d) + \Psi(t-T_d)]. \qquad (16)$$

Components near $2\omega_c$ outputted by multiplier 54 are attenuated by a matched filter 56 which is similar to matched filter 18. The output $h_2(t)$ of matched filter 56 is applied to a second sample and hold quantizing circuit 58.

It is known that $$h_1(t) \cong A^2 \cos(\omega_c T_d + \Delta) \qquad (17)$$

and $$h_2(t) \cong A^2 \sin(\omega_c T_d + \Delta) \qquad (18)$$

so that the phase change, $\Delta$, can be determined by the relationship $$\Delta = \tan^{-1}[h_2(t)/h_1(t)] - \omega_c T_d. \qquad (19)$$

Code converter logic circuitry 60 receives signals $h_1(t)$ and $h_2(t)$ and determines the nearest differential phase shift which corresponds to the various data levels. A read only memory (ROM) can be used to implement the code conversion.

Where $\omega_c T_d$ is expressed:

$$\omega_c T_d = 2\pi k, \; k = 0, 1, 2, \ldots \qquad (20)$$

then for binary PSK Table 1 gives the symbol outputs:

TABLE 1

| Symbol | Δ | $h_1(t)$ | $h_2(t)$ |
|---|---|---|---|
| 0 | 0° | $A^2$ | 0 |
| 1 | 180° | $-A^2$ | 0 |

For binary PSK output $h_2(t)$ is not needed and the embodiment of FIG. 1 will suffice, deciding on symbol "0" if $h_1(t)$ is closer to $+A^2$, or on symbol "1" if $h_1(t)$ is closer to $-A^2$.

For dibits (quatenary PSK or QPSK), Table 2 gives the symbol outputs:

TABLE 2

| Symbol | Δ | $h_1(t)$ | $h_2(t)$ |
|---|---|---|---|
| 00 | 0 | $A^2$ | 0 |
| 01 | 90° | 0 | $A^2$ |
| 10 | 180° | $-A^2$ | 0 |
| 11 | 270° | 0 | $-A^2$ |

Table 3 shows the symbol outputs for tribit demodulation.

TABLE 3

| Symbol | Δ | $h_1(t)$ | $h_2(t)$ |
|---|---|---|---|
| 000 | 0° | $A^2$ | 0 |
| 001 | 45° | $A^2 \sqrt{2}/2$ | $A^2 \sqrt{2}/2$ |
| 010 | 90° | 0 | $A^2$ |
| 011 | 135° | $-A^2 \sqrt{2}/2$ | $A^2 \sqrt{2}/2$ |
| 100 | 180° | $-A^2$ | 0 |
| 101 | 225° | $-A^2 \sqrt{2}/2$ | $-A^2 \sqrt{2}/2$ |
| 110 | 270° | 0 | $-A^2$ |
| 111 | 315° | $A^2 \sqrt{2}/2$ | $-A^2 \sqrt{2}/2$ |

In cases where $\omega_c T_d$ is not equal to $2\pi K$, the quantity $\omega_c T_d$ can be subtracted by appropriate circuitry from the phase change estimate prior to symbol decision.

Thus, the adaptive differential PSK demodulator of the present invention gives optimum demodulation and detection of differentially encoded PSK signals despite variations in the symbol rate. Moreover, by using a digitally tunable divider circuit (38) in the phase locked loop, a PSK receiver can be digitally tuned for corresponding changes in the symbol rate. Those skilled in the art will appreciate that various modifications fully within the scope of the present invention can be made. For example, one or a set of shift registers or other arrangements can be used as a delay device to interpose a variable delay. Further, other types of symbol decision arrangements can be devised, and other types of matched filters could be used.

While the present invention has been described in considerable detail, it is understood that various changes and modifications would occur to one of ordinary skill in the art without departing from the spirit and scope of the appended claims.

What is claimed is:

1. Apparatus for demodulating a modulated signal, comprising:
    means, coupled to said modulated signal, for delaying said modulated signal;
    means, responsive to said modulated signal and to said delayed signal, for multiplying said modulated and delayed signal together to produce at least one demodulated output signal; and
    means, responsive to said output signal, for detecting a parameter related to the symbol rate of said modulated signal and for adaptively varying the amount of delay interposed by said delay means in accordance with said detected parameter of said modulated signal.

2. The demodulator of claim 1 wherein said means for multiplying said signals comprises at least a pair of multiplier circuits, one of said multiplier circuits including means for phase shifting said modulated signal before application to said one of said multiplier circuits, whereby a multiple phase shift keyed signal is demodulated.

3. The demodulator of either claim 1 or 2 further including means, coupled to said output signal, for detecting changes in phase of said modulated signal and for outputting a signal representative thereof.

4. The demodulator of either claim 1 or 2 wherein said means for detecting a parameter related to the symbol rate of said modulated signal and for adaptively varying the amount of delay interposed by said delay means comprises means for detecting the symbol rate of said modulated signal and for generating timing signals related to said detected symbol rate, said timing signals being applied to said delay means, wherein the amount of delay interposed by said delay means is varied in accordance with the frequency of said timing signals.

5. The demodulator of claim 4 wherein said means for detecting the symbol rate of said modulated signal and for generating timing signals includes a transition detector for detecting transitions of said output signal, and a phase locked loop coupled to said transition detector and having a frequency responsive to detected transitions.

6. The demodulator of claim 5 wherein said phase locked loop generates clock pulses at a multiple of the symbol rate of the signal to be demodulated.

7. The demodulator of claim 4 further including means, coupled to said output signal, for detecting changes in phase of said modulated signal and for outputting a signal representative thereof.

8. The demodulator according to claim 7 wherein said phase detection means includes symbol decision means responsively coupled to said timing signals.

9. The demodulator of claim 8 wherein said symbol decision means includes a low pass filter coupling said output signal(s) to logic circuitry clocked by said timing signals.

10. The demodulator of claim 9 wherein said low pass filter is a matched filter.

11. The demodulator of either claim 1 or 2 wherein said delay means is a multistage charge coupled device.

12. A differential demodulator comprising: multistage delay means for receiving and delaying a signal to be demodulated;
    multiplier means, responsive to said signal to be demodulated and a delayed signal from said delay means, for producing at least one demodulated output signal;
    means, coupled to said multiplier means, for detecting the symbol rate of said signal to be demodulated and for generating pulses at a frequency which is a multiple of the symbol rate of said signal to be demodulated and the effective number of stages in said multistage delay means, said pulses being applied to said delay means for clocking said delayed signal therethrough, wherein the amount of time delay interposed by said delay means is adaptively varied in accordance with detected changes in the symbol rate; and
    symbol decision means coupled to an output of said multiplier means for detecting changes in phase of said signal to be demodulated and for outputting a signal representative thereof.

13. A differential demodulator for multiple phase shift keyed signals comprising:
    multistage delay means for receiving and delaying a signal to be demodulated;
    multiplier means, responsive to said signal to be demodulated and a delayed signal from said delay means, said multiplier means including at least a pair of multiplier circuits, one of said multiplier circuits including means for phase shifting said signal to be demodulated, each multiplier circuit producing at least one demodulated output signal;
    means, coupled to said multiplier means, for detecting the symbol rate of said signal to be demodulated and for generating pulses at a frequency which is a multiple of the symbol rate of said signal to be demodulated and the effective number of stages in said multistage delay means, said pulses being applied to said delay means for clocking said delayed signal therethrough, wherein the amount of time delay interposed by said delay means is adaptively varied in accordance with detected changes in the symbol rate; and
    symbol decision means coupled to at least one output of said multiplier means for detecting changes in phase of said signal to be demodulated and for outputting a signal representative thereof.

14. The demodulator of either claim 12 or 13 wherein said symbol decision means includes low pass filter means, responsive to an output of said multiplier means, for attenuating signals at twice the carrier frequency of said signal to be demodulated.

15. The demodulator of either claim 12 or 13 wherein said means for detecting the symbol rate of said signal includes a transition detector responsive to said output signal(s) of said multiplier means for generating output signals corresponding to transitions in said multiplier output signal(s).

16. The demodulator of claim 15 wherein said pulse generating means further includes a phase locked loop coupled to said transition detector.

17. The demodulator of claim 16 wherein said phase locked loop includes a phase detector coupled to said transition detector, a loop filter coupled to an output of said phase detector, and a voltage controlled oscillator coupled to an output of said loop filter.

18. The demodulator of claim 16 wherein said phase locked loop includes first and second divider circuits for outputting respective first and second pulses at first and second frequencies related to the symbol rate of said signal to be demodulated.

19. The demodulator of claim 18 wherein the division ratio of at least one of said divider circuits is digitally selectable.

20. The demodulator of either claim 12 or 13 wherein said delay means is a multistage charge coupled device.

21. The demodulator of claim 13 wherein said symbol decision means includes logic circuitry responsive to said multiplier output signals for determining which of a set of preselected logic values is closest to said multiplier output signals and for outputting a signal representative thereof.

22. The demodulator of claim 12 wherein said symbol decision means includes a low pass filter responsive to said multiplier output signal, comparator means coupled to an output of said low pass filter, and a flip-flop coupled to the output of said comparator, said flip-flop being clocked at the symbol rate.

23. The demodulator of either claim 12 or 13 wherein said pulse generating means produces second pulses at the symbol rate, said second pulses clocking said symbol decision means.

24. Apparatus for demodulating a phase shift keyed signal, said signal being transmitted at a baud rate which may vary, comprising:
 a multistage delay device coupled to said modulated signal;
 at least one multiplier circuit, coupled to said modulated signal and a delayed signal from said delay device, for producing a demodulated output signal representative of the product of said modulated signal and said delayed signal;
 a transition detector, coupled to said multiplier output signal, for detecting transitions of said multiplier output signal and for generating an output signal corresponding to said detected transitions;
 a phase locked loop responsive to said transition detector output signal including a first divider circuit for outputting first pulses at a digitally selectable multiple of the signal baud rate and a second divider circuit for outputting second pulses at the signal baud rate;
 said first pulses being applied to said multistage delay device for clocking said delayed signal therethrough whereby the amount of time delay interposed by said delay device is adaptively varied in accordance with detected changes in the signal baud rate so as to optimize the differential demodulation of said signal; and
 symbol decision means coupled to an output of said multiplier circuit and responsive to said second pulses for detecting changes in phase of said modulated signal and for outputting a signal representative thereof.

25. The demodulator of claim 24 wherein said symbol decision means comprises:
 a low pass filter coupled to said multiplier output;
 a comparator having an input connected to an output of said filter; and
 a flip-flop having one input coupled to the output of said comparator and a second input coupled to said second pulses of said phase locked loop to clock said flip-flop at the baud rate, said flip-flop outputting signals representative of detected changes in phase of said modulated signal.

26. Apparatus for demodulating a multiple phase shift keyed signal, said signal being transmitted at a baud rate which may vary, comprising: a multistage delay device coupled to said modulated signal;
 at least first and second multiplier circuits, coupled to said modulated signals and a delayed signal from said delay device, for producing respective first and second demodulated output signals representative of the product of said modulated signal and said delayed signal;
 a transition detector, coupled to said first and second multiplier output signals, for detecting transitions of said multiplier output signals and for generating output signals corresponding to said detected transitions;
 a phase locked loop responsive to said transition detector output signals including a first divider circuit for outputting first pulses at a digitally selectable multiple of the signal baud rate and a second divider circuit for outputting second pulses at the signal baud rate;
 said first pulses being applied to said multistage delay device for clocking said delayed signal therethrough whereby the amount of time delay interposed by said delay device is adaptively varied in accordance with detected changes in the signal baud rate so as to optimize the differential demodulation of said signal; and
 symbol decision means coupled to the outputs of said multiplier circuits and responsive to said second pulses for detecting changes in phase of said modulated signal and for outputting a signal representative thereof.

27. The demodulator of claim 26 wherein said symbol decision means comprises:
 first and second low pass filters respectively coupled to said first and second multiplier outputs; and
 logic circuitry responsive to the outputs of said multiplier circuits and said second pulses of said phase locked loop for determining which of a set of preselected logic values is closest to said filtered multiplier output signals and for outputting a signal representative thereof.

28. The demodulator of either claim 24 or 26 wherein said delay device is a multistage charge coupled device.

29. The demodulator of either claim 24 or 26 wherein said first pulses of said phase locked loop are outputted at a frequency equal to the product of the signal baud rate and the number of stages in said delay device.

30. The demodulator of either claim 25 or 27 wherein each of said low pass filters is a matched filter for attenuating signals at twice the carrier frequency of said modulated signal.

31. The demodulator of claim 25 wherein said comparator has an input connected to a selectively variable threshold voltage.

32. A method of demodulating a phase shift keyed modulated signal comprising:
 delaying said modulated signal;
 multiplying said modulated signal and said delayed signal to form a product signal;

deriving timing signals from said product signal related to the symbol rate of said modulated signal;
sampling said product signal in accordance with said timing signals to provide a demodulated output signal; and adjusting said delaying step to interpose a delay in accordance with a parameter of said timing signals.

33. The method of claim 32 wherein said delaying step comprises clocking said phase shift keyed modulated signal through multiple stages of a multistage delay device, said step of deriving timing signals includes generating a first set of clock pulses at a multiple of said symbol rate and the number of stages through which said phase shift keyed modulated signal is clocked for clocking said modulated signal through said delay device and generating a second set of clock pulses at said symbol rate, and said step of sampling said product signal comprises applying said second clock pulses to logic circuitry for digitizing said product signal.

34. A method of demodulating a phase shift keyed modulated signal comprising:

delaying said signal by clocking it through a multistage delay device;
multiplying said delayed signal and said phase shift keyed modulated signal to produce a product signal;
detecting transitions in said product signal to derive timing signals phase locked to the symbol rate of said phase shift keyed modulated signal;
sampling said product signal at times determined by said timing signals to provide a demodulated output signal; and
clocking said multistage delay device with clocking signals at a rate related to the frequency of said timing signals.

35. The method of claim 34 wherein said clocking step includes altering the frequency of said timing signals by a factor to yield clocking signal whose frequency is a multiple of the number of stages through which said phase shift keyed modulated signal is clocked and the symbol rate to which said timing symbols are most currently phase locked.

36. The method of either claim 32 or 34 wherein said demodulated output signal is digitally encoded.

* * * * *

UNITED STATES PATENT AND TRADEMARK OFFICE
CERTIFICATE OF CORRECTION

PATENT NO. : 4,320,345

DATED : March 16, 1982

INVENTOR(S) : William N. Waggener

Page 1 of 2

It is certified that error appears in the above-identified patent and that said Letters Patent are hereby corrected as shown below:

Column 3, line 27, "$Z(t) = \sqrt{2} A \cos[\omega_c t + \Psi(t)] + \eta(t)$" should read -- $Z(t) = \sqrt{2} A \cos[\omega_c t + \Psi(t)] + \tilde{\eta}(t)$ --.

Column 3, line 65, "$Y(t) = A^2 \hat{\alpha}(t) \cos(\omega_c T_d) +$ terms at $2\omega_c$" should read -- $Y(t) = A^2 \hat{d}(t) \cos(\omega_c T_d) +$ terms at $2\omega_c$ --.

Column 3, line 67, "$\hat{\alpha}(t) = \pm 1$" should read -- $\hat{d}(t) = \pm 1$ --.

Column 4, line 51, "$H(t) \cong A^2 (\cos \omega_c T_d) \cdot \hat{\alpha}(t).$" should read -- $H(t) \cong A^2 (\cos \omega_c T_d) \cdot \hat{d}(t).$ --.

Column 5, line 57, "$Z'(t) = \sqrt{2} A \sin[\omega_c t + \Psi(t)] + \eta(t)$" should read -- $Z'(t) = \sqrt{2} A \sin[\omega_c t + \Psi(t)] + \tilde{\eta}(t)$ --.

UNITED STATES PATENT AND TRADEMARK OFFICE
CERTIFICATE OF CORRECTION

PATENT NO. : 4,320,345

DATED : March 16, 1982

INVENTOR(S) : William N. Waggener

It is certified that error appears in the above-identified patent and that said Letters Patent are hereby corrected as shown below:

Claim 35, column 12, line 17, "signal" should read — signals —.

Signed and Sealed this

Twelfth Day of October 1982

[SEAL]

Attest:

GERALD J. MOSSINGHOFF

Attesting Officer     Commissioner of Patents and Trademarks